J. S. FAIRFAX.
Street Car.
No. 60,868.  Patented Jan. 1, 1867.
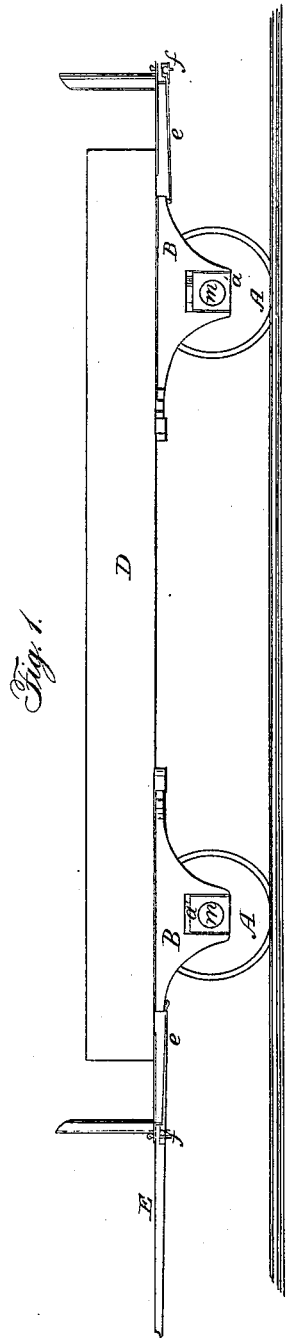
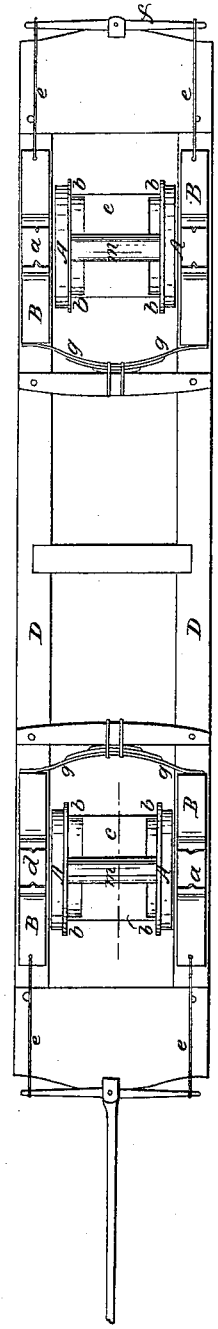
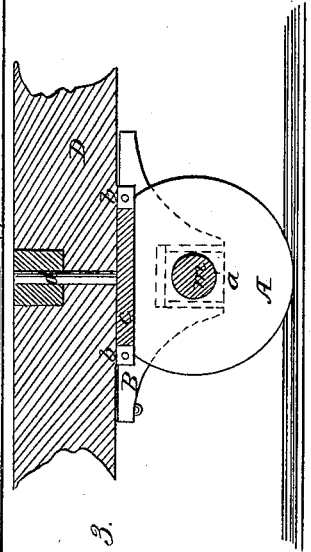
Witnesses:  Inventor:

UNITED STATES PATENT OFFICE.

JOSEPH S. FAIRFAX, OF WHEELING, WEST VIRGINIA.

IMPROVEMENT IN RAILROAD-CARS.

Specification forming part of Letters Patent No. 60,868, dated January 1, 1867.

*To all whom it may concern:*

Be it known that I, JOSEPH S. FAIRFAX, of Wheeling, in the county of Ohio and State of West Virginia, have invented a new and useful Improvement in Street-Railroad Cars; and I do hereby declare that the following is a full, clear, and exact description thereof, which will enable others skilled in the art to make and use the same, reference being had to the accompanying drawings forming part of this specification, in which—

Figure 1 is a side view of a car-bed having my improvement on it. Fig. 2 is a bottom view of the same, showing the improvements in detail. Fig. 3 is a longitudinal vertical section of one track. Fig. 4 is a detached view of one side of the truck or pair of wheels.

Similar letters of reference indicate like parts.

This invention relates to improvements in a street-railroad car, the principal object of which is to enable the car to turn curves easily, so that it may be stopped on the curve, if desired, and be started again without difficulty. There are other advantages connected with the application of these improvements to street-cars.

At one or both ends of the bed of a car the pair of wheels A A are hung on an axle, $m$, in the ordinary manner. The arms or ends of the axle run in square chucks or blocks, $a$ $a$, which fit in pedestals or pendent frames, B B, placed immediately underneath the beams of the bed D, on each side. The pedestals are connected together by cross-braces, $b$ $b$, before and behind the wheels A A, which braces, $b$ $b$, are connected by a block or center brace, $c$, between the wheels, forming together a truck. A center pin or bolt, $d$, passes up through the center block $c$ to a cross-bar of the bed, on which the truck and wheels are suspended and turn as a pivot; and on the face of the beams of the bed, against which the side pedestals B B bear and work when the truck is turned, are fastened flat iron or steel plates to prevent wear by friction. The tops of the pedestals may also be protected in the same manner. The forward ends of the pedestals B B are connected by iron rods $e$ $e$, on each side of the car, with a splinter bar or evener, $f$, which turns on the same bolt or pin as the draft-pole E, and with it. Behind the truck are placed half-elliptic springs, $g$ $g$, which bear against the rear ends of the pedestals B B, and bring them even and square with the car after turning a curve. Instead of elliptic, spiral springs may be employed. It will be seen that, when the draft-pole is moved to one side in turning a curve in the road, the rods $e$ $e$ will draw the pedestals B B around, and with them the wheels A A, to suit the curve, by which means of adaptation of the wheels the car will pass a curve very readily, and may be stopped and started again upon it without difficulty.

Having described my invention, I claim as new and desire to secure by Letters Patent—

The arrangement of the vibrating pedestals B B, connected with and supported by the cross-braces $b$ $b$ and the center block $c$, combined with the rods $e$ $e$, the splinter bar $f$, and the spring $g$ $g$, when applied to a street-railroad car, constructed and operating substantially as and for the purposes herein described.

JOSEPH S. FAIRFAX.

Witnesses:
 WM. D. ENGLISH,
 JOHN BUTTERFIELD.